(12) United States Patent
Bissell

(10) Patent No.: US 6,232,752 B1
(45) Date of Patent: May 15, 2001

(54) DC/DC CONVERTER WITH SYNCHRONOUS SWITCHING REGULATION

(76) Inventor: Stephen R. Bissell, 3405 Shinoak Dr, Austin, TX (US) 78731

( * ) Notice: Subject to any disclaimer, the term of this patent is extended or adjusted under 35 U.S.C. 154(b) by 0 days.

(21) Appl. No.: 09/438,550

(22) Filed: Nov. 10, 1999

(51) Int. Cl.$^7$ ...................................................... G05F 3/16
(52) U.S. Cl. ........................... 323/225; 323/222; 323/271
(58) Field of Search .................................. 323/222, 225, 323/271, 282

(56) References Cited

U.S. PATENT DOCUMENTS

| | | |
|---|---|---|
| 4,395,675 | 7/1983 | Toumani . |
| 4,459,537 | 7/1984 | McWhorter ........................... 323/224 |
| 4,903,189 * | 2/1990 | Ngo et al. .............................. 363/127 |
| 5,146,399 * | 9/1992 | Gucyski .................................. 363/89 |
| 5,216,351 | 6/1993 | Shimoda ............................... 323/224 |
| 5,406,471 * | 4/1995 | Yamanaka ............................. 323/271 |
| 5,548,463 | 8/1996 | Aldridge et al. ...................... 323/272 |
| 5,592,072 | 1/1997 | Brown ................................... 323/268 |
| 5,721,483 | 2/1998 | Kolluri et al. ......................... 323/224 |
| 5,844,399 * | 12/1998 | Stuart .................................... 323/222 |
| 5,914,588 | 6/1999 | Jiang ..................................... 323/267 |
| 5,926,013 | 7/1999 | Brandt .................................. 323/370 |

OTHER PUBLICATIONS

Chee, San Hwa "Low Dropout 550kHz DC/DC Controller Operates from Inputs as Low as 2V"—Design Note 208, *Linear Technology Design Notes*, Circle No. 219 Jul. 99 (no page #s).

"Boost/linear regulator derives 5V from four cells," pp. 14–15 no date.

R. Severns, G. Bloom, "Modern DC–to–DC Switchmode Power Converter Circuits" pp. 159–161 (1985) no month.

* cited by examiner

*Primary Examiner*—Shawn Riley
(74) *Attorney, Agent, or Firm*—Akin, Gump, Strausss, Hauer & Feld, L.L.P.

(57) ABSTRACT

A DC/DC converter combines elements of a boost and a buck converter with synchronous switching and a single controller to provide a step-up or step-down regulator with continuous input and output currents. A boost converter composed of an inductor in series with the input, a switch to ground, and a diode to an intermediate voltage node provides an intermediate voltage that is greater than the input voltage. A buck converter composed of a switch in series with the intermediate voltage node, a diode to ground, and an inductor in series with the output provides an output voltage that is less than the intermediate voltage. The output is regulated by a single pulse width modulating controller which drives the boost switch and buck switch simultaneously. This technique provides a DC/DC converter that can operate with an input voltage greater than or less than the output voltage. Further, series inductance on both input and output nodes provides continuous input and output AC current reducing conducted noise effects. Further, the input and output inductors have equivalent volt-second characteristics allowing for the possibility to couple the input and output inductors on a single magnetic element. An isolated form of the invention is possible by replacing the buck stage with a transformer-isolated forward converter.

20 Claims, 15 Drawing Sheets

DC/DC CONVERTER WITH SYNCHRONOUS SWITCHING REGULATION

BACKGROUND

1. Technical Field of the Invention

The present invention relates to the field of DC/DC converters. In one aspect, the present invention relates to a method and apparatus for converting a first voltage to a second predetermined voltage under the control of synchronous switching to provide continuous AC current, low noise DC voltage conversion.

2. Description of Related Art

DC/DC converters by convention are classified in one of five types; buck, boost, buck-boost, SEPIC (single-ended parallel inductor converter), and Cuk. These converters are composed of at least one switch, diode, inductor, and capacitor in various configurations to convert an input DC voltage into an output DC voltage. In their simplest form they are non-isolated but with the addition of a transformer isolation can be provided without altering basic properties. Each type converter has unique characteristics that give it an advantage in a particular application.

FIG. 1 illustrates a non-isolated buck converter having a MOSFET power transistor Q1 switching on and off with a percentage on-time duty cycle d, an inductor L1, diode D1, and capacitor C1. The output voltage relates to the input voltage by the equation $Vo=Vi \times d$. This type converter is used when the input voltage must be stepped-down. The input voltage must always be greater than the output voltage for proper operation. The inductor in series with the output node provides smoothing of the AC ripple current reducing output noise. However, the input is characterized by high AC ripple current.

FIG. 2 illustrates a non-isolated boost converter having transistor Q2, inductor L2, diode D2, and capacitor C2. The output voltage relates to the input voltage by the equation $Vo=Vi/(1-d)$. This type converter is used when the input voltage must be stepped-up. The input voltage must always be less than output voltage for proper operation. The inductor in series with the input node provides smoothing of the AC ripple current reducing input noise. However, the output is characterized by high AC ripple current.

FIG. 3 illustrates a non-isolated buck-boost converter having transistor Q3, inductor L3, diode D3, and capacitor C3. The output voltage relates to the input voltage by the equation $Vo=-Vi \times d/(1-d)$. This type converter is operable with input voltages that are greater than, less than, or equal to the output voltage. However, the output polarity is inverted. Changing the inductor into a transformer could correct the inversion making it a conventional flyback converter. Also, there is no inductor in series with the input or output nodes to provide smoothing. Both input and output are characterized by high AC ripple current.

FIG. 4 illustrates a non-isolated SEPIC converter having a transistor Q4, inductors L4 and L5, diode D4, and capacitors C4 and C5. The output voltage is related to the input voltage by the equation $Vo=Vi \times d/(1-d)$. This type converter is operable with input voltages that are greater than, less than, or equal to the output voltage. The inductor in series with the input node provides smoothing of the AC ripple current reducing input noise. However, the output is characterized by high AC ripple current.

FIG. 5 illustrates a non-isolated Cuk converter having a transistor Q5, inductors L6 and L7, diode D5, and capacitors C6 and C7. The output voltage is related to the input voltage by the equation $Vo=-Vi \times d/(1-d)$. This type converter is operable with input voltages that are greater than, less than, or equal to the output voltage. However, the output polarity is inverted. An additional transformer is required to correct the inversion. The inductors in series with both input and output nodes provide smoothing of the AC ripple current reducing both input and output noise.

FIG. 5a illustrates a transformer-isolated two-transistor forward converter having transistors Q6 and Q7, diodes D6, D7, D8, and D9, transformer T1, inductor L8, and capacitor C8. The transistors are on and off simultaneously. When the transistors are on the input voltage is applied across the primary winding and transformed across the secondary winding proportionately as the ratio of primary to secondary turns on the transformer, n. The secondary voltage charges inductor L8 through diode D8 and capacitor C8. When the transistors are off the magnetizing energy is discharged through D6 and D7 clamping the primary winding to the input voltage in the opposite polarity. During the off period inductor L8 discharges through diode D9 and capacitor C8. The output voltage across C8 is related to the input voltage, transformer turns ratio n, and duty cycle d by the equation $Vo=Vi \times d/n$. In order to maintain balanced magnetic flux in the transformer the maximum duty cycle d is limited to 50%. This type of converter is applicable when electrical isolation is required or when the input voltage is much greater than or much less than the output voltage. The inductor in series with the output provides smoothing of the AC ripple current reducing output noise. However, the input is characterized by high AC ripple current.

FIG. 5b illustrates a transformer-isolated single transistor forward converter having transistor Q8, diodes D10, D11, and D12, transformer T2 with a primary winding and two secondary windings, inductor L9, and capacitor C9. When the transistor is on the input voltage is applied across the primary winding and transformed across the first secondary winding proportionately as the ratio of primary to secondary turns on the transformer, n. The secondary circuitry operates the same as in the two-transistor forward converter. When the transistor is off the magnetizing energy is discharged through a second secondary winding and D10 clamping the winding to the input voltage in the opposite polarity. The second secondary winding typically has the same number of turns as the primary winding. In order to maintain balanced magnetic flux in the transformer the maximum duty cycle d is limited to 50%. This type converter has typically the same performance characteristics as the two-transistor forward converter. It has fewer components but the transistor has greater voltage stress than the two-ransistor version and the transformer requires an additional winding.

The demands of battery-sourced, battery-backed, and distributed power systems with point-of-load regulation have placed greater requirements for wide-range input (step-up/step-down) DC/DC converters with low noise inputs and outputs in small economical packages. The conventional converters illustrated above fall short in at least one of those respects. The buck and boost converters are limited by the range of input voltages which restricts the choice of battery cell count or system buss voltage. Input and output noise in any converter can be improved with additional filtering but it adds to the overall size and cost of the DC/DC converter. The Cuk converter is a wide-range input (step-up/step-down) with low noise inputs and outputs but has an inverted output.

Further limitations and disadvantages of conventional systems will become apparent to one of skill in the art after reviewing the remainder of the present application with reference to the drawings and detailed description which follow.

SUMMARY OF THE INVENTION

In accordance with the invention, a non-isolated DC/DC converter is configured to allow a wide input voltage range and provide a step-up or step-down conversion of the input into an output of the same polarity. The input and output AC ripple current is continuous yielding reduced noise effects. The invention comprises two inductors, two switches, two diodes, and at least two capacitors. A single controller regulates the output voltage by providing a pulse width modulated signal which drive the switches on and off.

In another embodiment of the invention the two inductors are combined on a common magnetic core. The coupled inductors further reduce ripple current on the input and output as the magnetic flux becomes split between the inductors.

In both embodiments energy is stored in the inductors when the switches are closed and discharged through the diodes when the switches are open. The switches are turned on and off synchronously by a signal generated by the pulse width modulator (PWM) controller. The first inductor, switch, and diode behave as a boost converter generating an intermediate voltage across a capacitor to ground that is greater than the input voltage. The second switch, inductor, and diode behave as a buck converter generating an output voltage that is less than the intermediate voltage. The output voltage is related to the input voltage by the equation $Vo=Vi \times d/(1-d)$.

The benefits provided by the present invention are its operability with input voltages that are greater than, less than, or equal to the output voltage. Further, the ripple current on the input and output is continuous reducing noise. Further, the conversion is performed without the need for inversion. Finally, the input and output inductors can be coupled together on a single magnetic core further reducing ripple current and component count.

In accordance with the invention, a voltage converter having an input terminal and an output terminal is provided in which a first inductor is coupled to the input terminal, a second inductor is coupled to the output terminal, a first switch connects the first inductor to ground, a second switch is coupled to the first inductor and the first switch, a first capacitor is coupled between the second switch and ground, a third switch connects the second inductor to the first capacitor; a fourth switch coupled between the second inductor and ground, a second capacitor connected between the output terminal and ground, and a control signal generator for generating a first control signal to control the first and third switches such that energy stored in the first inductor is transferred to the first capacitor when the first switch is open and energy stored in the second inductor is transferred to the second capacitor when the third switch is open. In one embodiment, the first and second inductors are integrated onto a common magnetic core. In another embodiment, the first and third switches are MOSFET power transistors. In accordance with yet another embodiment, the second and fourth switches can be diodes, can be MOSFET transistors, or can be other switching devices. In addition, the control signal generator can generate a second control signal for controlling the second and fourth switches, where the second control signal is the complement of the first control signal.

In accordance with an alternate embodiment of the present invention, a method for converting a first voltage to a second voltage is provided in a circuit having an input node, an intermediate node and an output node, whereby a control signal is generated having a first phase and a second phase. Under control of the control signal, the first voltage is selectively applied across a first inductor that is coupled to the input node to charge the first inductor during the first phase of the control signal. In addition, the intermediate node is selectively charged with discharging current from the first inductor during the second phase of the control signal to generate an intermediate voltage on the intermediate node. As the intermediate voltage is selectively connected to a second inductor coupled to the output node thus charging current in the second inductor during the first phase of the control signal; a second voltage is developing across an output capacitor coupled to the output node with discharging current from the second inductor. In one embodiment, the second voltage developed divided by the first voltage is equal to the ratio of the duration of the first phase to the duration of the second phase. In another embodiment, the first phase of the control signal is the high portion of the control signal and the second phase of the control signal is the low portion of the control signal, and the value of the second voltage is greater than the value of the first voltage when the duration of the first phase of the control signal is greater than the duration of the second phase of the control signal. In yet another embodiment, the value of the second voltage is less than the value of the first voltage when the duration of the first phase of the control signal is less than the duration of the second phase of the control signal. The first voltage can be selectively applied across a first inductor by connecting the first inductor in parallel with the first voltage with a switch that is conductive during the first phase of the control signal. In addition, the intermediate node can be selectively charged with current from the first inductor by discharging the first inductor across a capacitor connected between the intermediate node and ground. The intermediate voltage can be selectively connected to a second inductor by connecting the second inductor in series with the intermediate node with a switch that is conductive during the first phase of the control signal. In addition, the second voltage can be developed across an output capacitor by connecting the second inductor in parallel with the output capacitor during the second phase of the control signal, and can also be electrically isolated from the operation of the circuit which selectively applies the first voltage across the first inductor. When the control signal is generated, the duration of the first phase can be dynamically adjusted in response to any change in the first voltage to maintain a constant value for the second voltage. In yet another embodiment of the present invention, the first voltage and intermediate voltage are selectively applied across first and second inductors that have substantially equivalent voltsecond characteristics and that are integrated on a common magnetic core.

In accordance with a still further embodiment of the present invention, a DC/DC converter is provided for converting a first voltage to a second voltage having a first subcircuit for charging an intermediate capacitor to an intermediate voltage greater than the first voltage and a second subcircuit coupled to the first subcircuit for discharging the intermediate capacitor from an intermediate voltage. In one embodiment, the first subcircuit includes an input node for receiving the first voltage, a first inductor coupled to the input node and a first switch device for alternately connecting the first inductor to common ground and the intermediate capacitor in response to a control signal. In another embodiment, the second subcircuit includes a second inductor coupled to an output capacitor and a second switch for alternately connecting the second inductor to the intermediate capacitor and common ground in response to the same control signal to thereby generate the second voltage across the output capacitor. In one embodiment, the second subcircuit can be a transformer-isolated forward converter for transforming the intermediate voltage synchronized with the control signal. In another embodiment, the first and second inductors can share a common magnetic core.

DETAILED DESCRIPTION OF THE DRAWINGS

Figure 1:
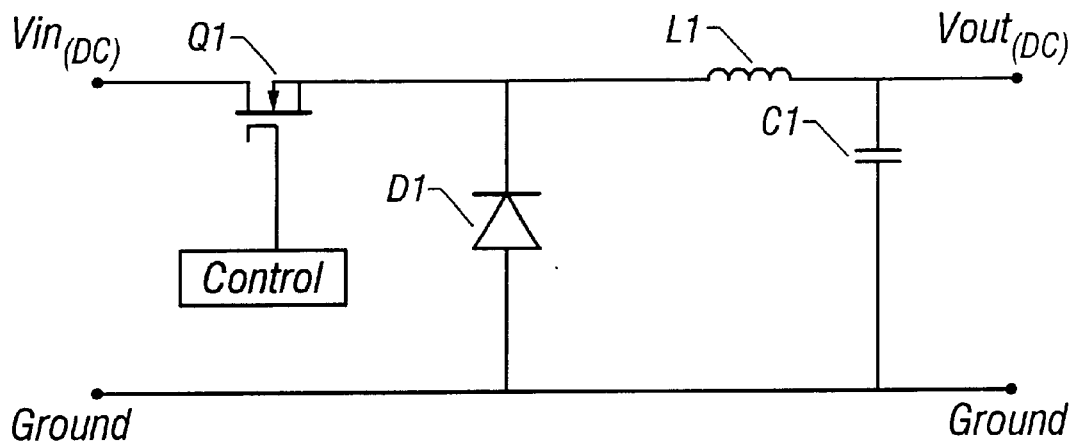
FIG. 1 illustrates a non-isolated buck converter.
Figure 2:
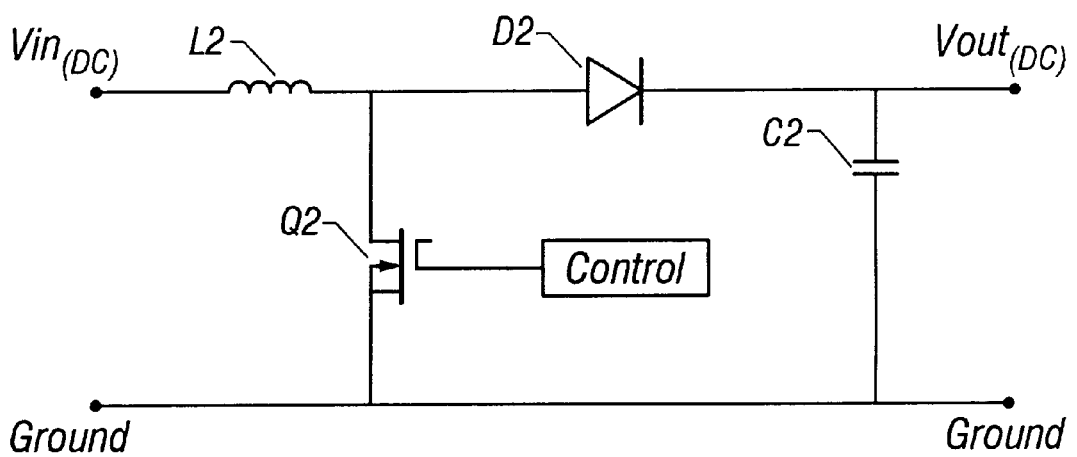
FIG. 2 illustrates a non-isolated boost converter.
Figure 3:
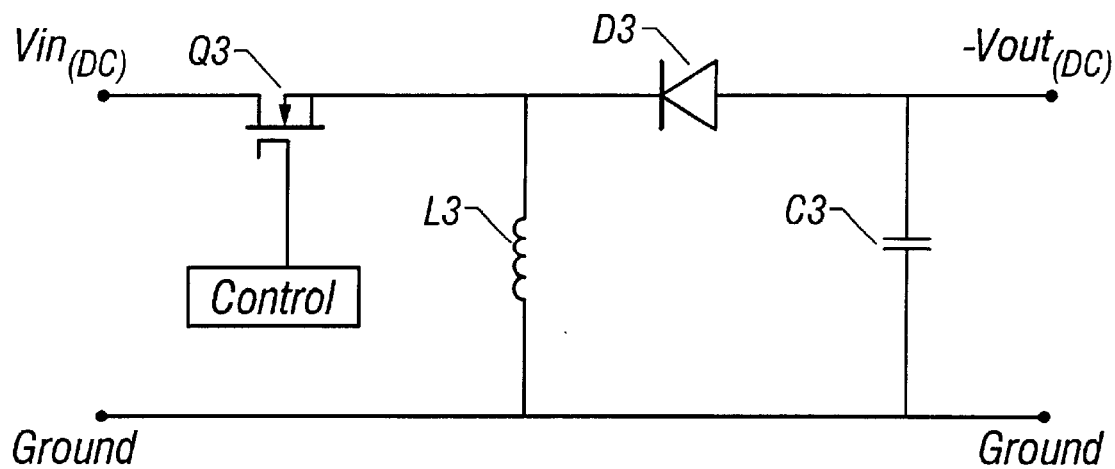
FIG. 3 illustrates a non-isolated buck-boost converter.
Figure 4:
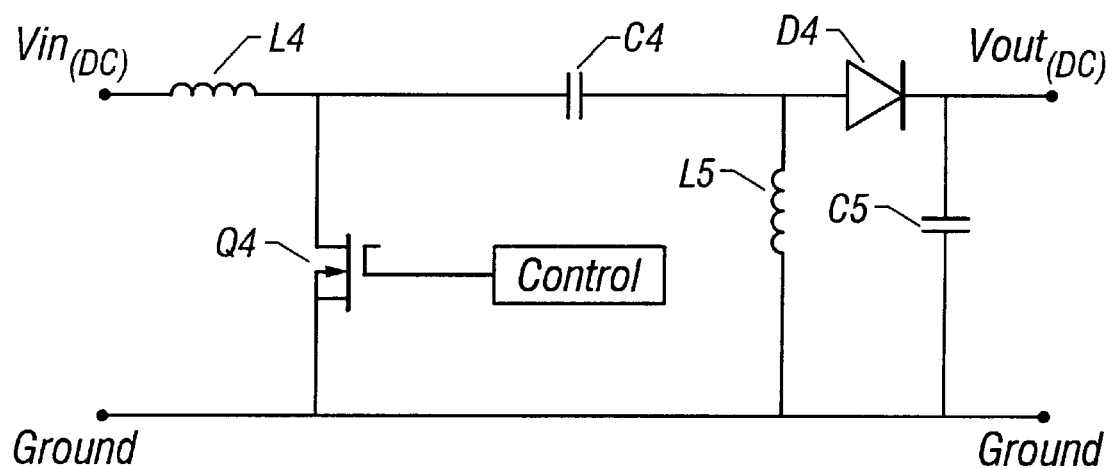
FIG. 4 illustrates a non-isolated SEPIC converter.
Figure 5:
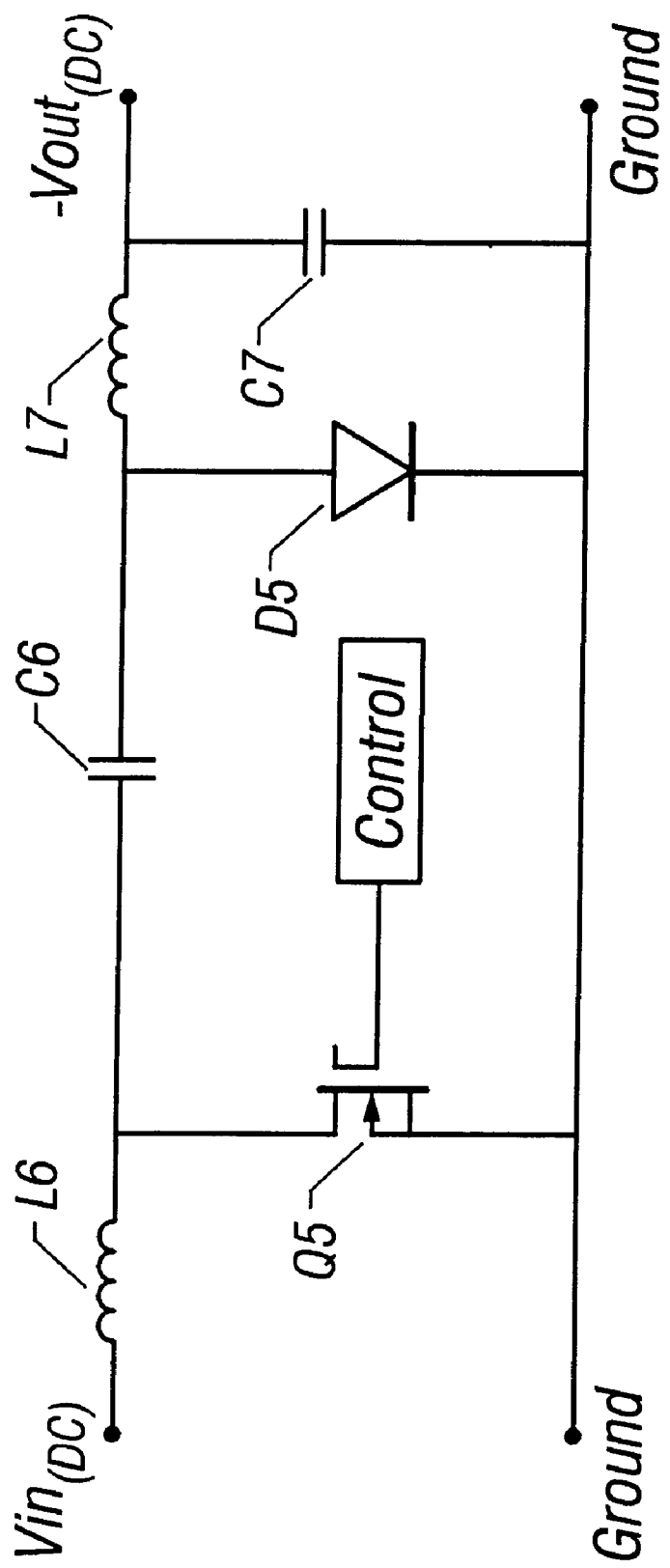
FIG. 5 illustrates a non-isolated Cuk converter.
Figure 5A:
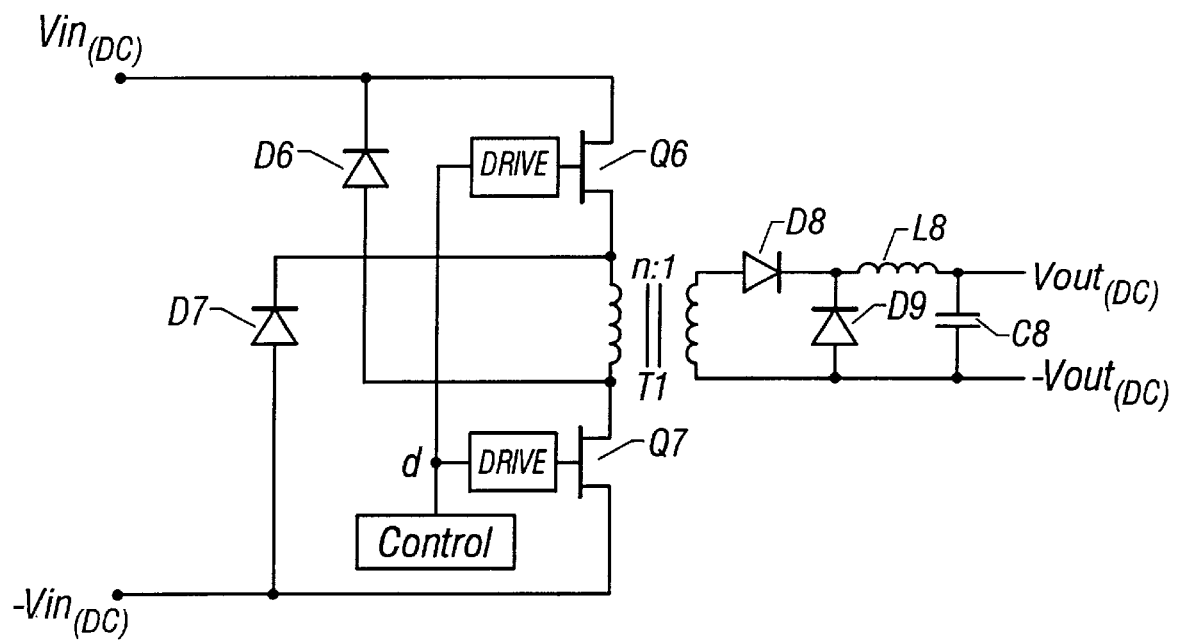
FIG. 5a illustrates a transformer-isolated two transistor forward converter.
Figure 5B:
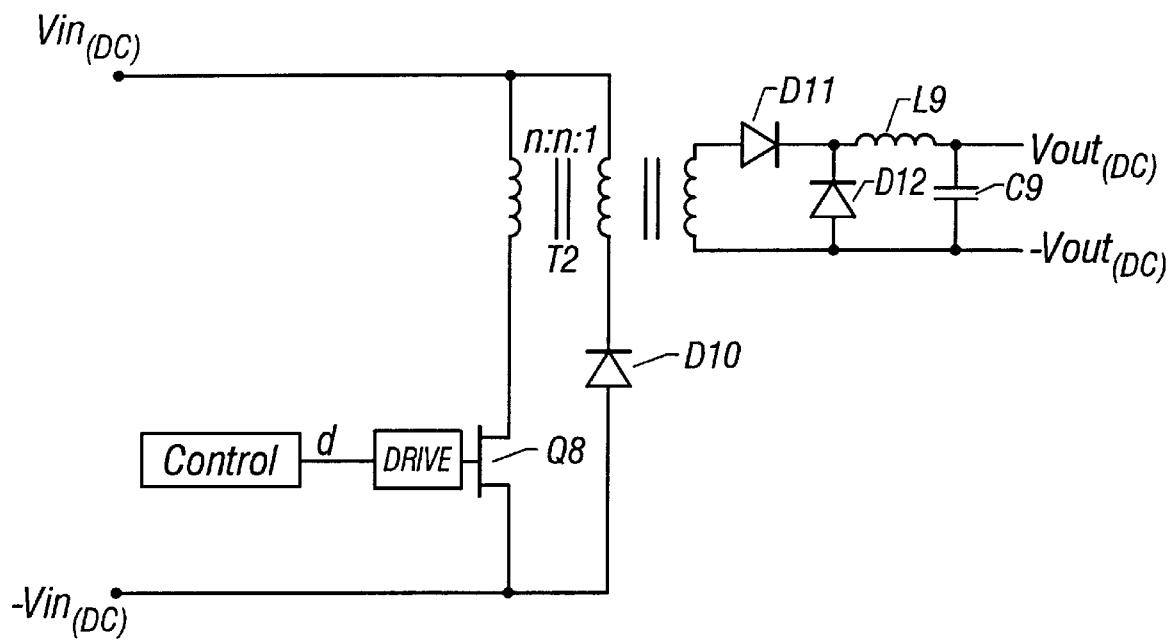
FIG. 5b illustrates a non-isolated single transistor forward converter.
Figure 6:
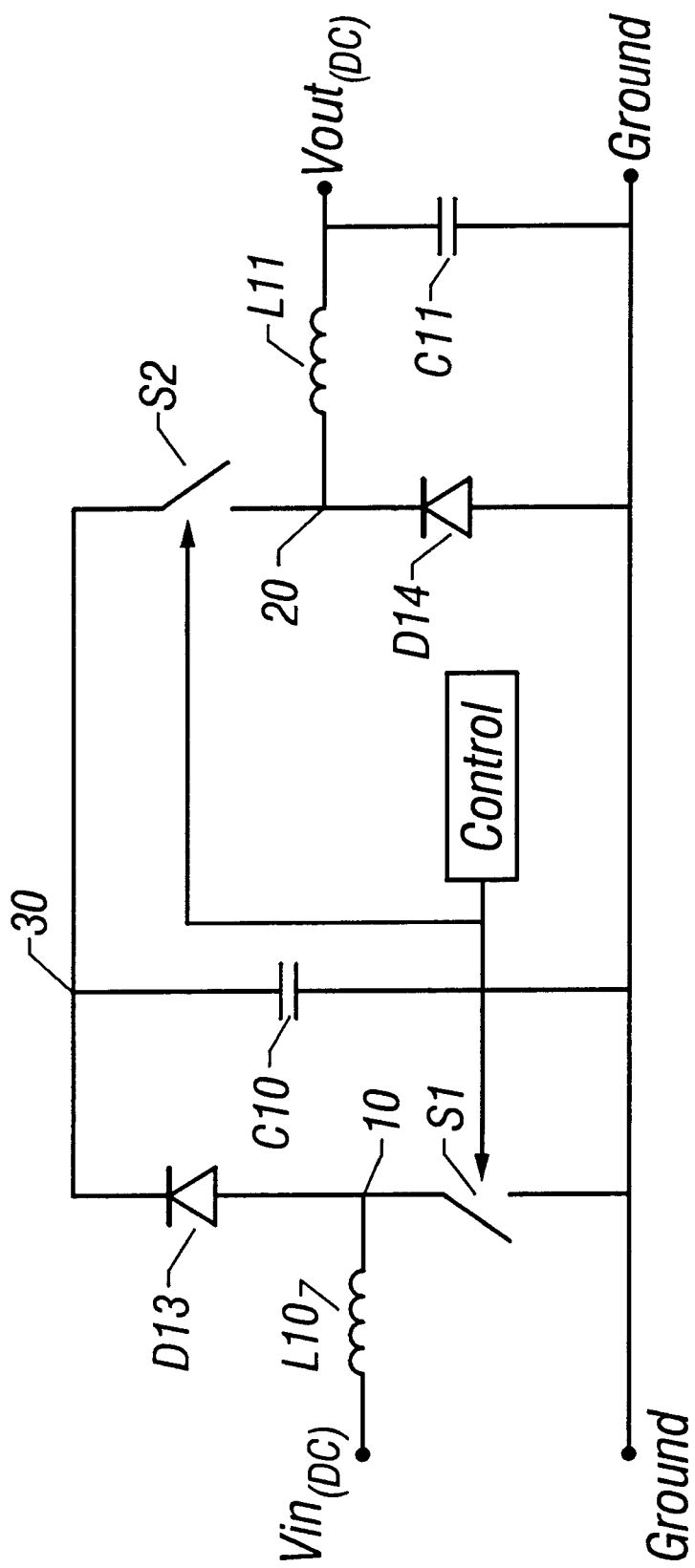
FIG. 6 illustrates one embodiment of providing a step-up/step-down synchronous DC/DC converter in accordance with the present invention.

The synchronous switching regulator is illustrated in FIG. 6. Inductor L10 is connected in series with input voltage node and switch S1 and diode D13. The second node of S1 connects to ground. The second node of diode D13 connects to the intermediate voltage node 30. Capacitor C10 is connected across the intermediate voltage node 30 and ground. Inductor L11 is connected in series with the output voltage node and switch S2 and diode D14. The second node of S2 connects to the intermediate voltage node 30. The second node of diode D14 connects to ground. The controller circuit monitors the output voltage node and generates a single pulse width modulated (PWM) signal to the drivers of S1 and S2 causing the switches to turn on and turn off synchronously.

The transfer function of the synchronous switching regulator can be approximated using ideal components as follows. The switching duty cycle (fraction of time switch is on) of both switches S1 and S2 is represented by d (a value between zero and 1). The boost stage converts an input DC voltage Vi into an intermediate DC voltage V' at node 30. The relationship between Vi and V' can be described by the equation V'=Vi/(1−d). The buck stage converts an intermediate DC voltage V' into a output DC voltage Vo. The relationship between Vo and V' can be described by the equation Vo=V'×d. Combining the first and second equations yields a relationship between the input DC voltage Vi and output DC voltage Vo as described by the equation Vo=Vi×d/(1−d).

As the switching duty cycle d varies, the output voltage Vo varies with respect to Vi. If duty cycle d is less than 0.5 the output voltage Vo is less than input voltage Vi. If duty cycle d is greater than 0.5, the output voltage Vo is greater than input voltage Vi. If duty cycle d is equal to 0.5 the output voltage, Vo is equal to the input voltage Vi. This characteristic provides the capability to step-up or step-down an input voltage and will maintain a regulated output voltage with an input voltage that is less than, greater than, or equal to the regulated output voltage.

The intermediate DC voltage V' is not a regulated voltage point. This point will vary in voltage as the input voltage varies. The relationship between intermediate voltage V' and input voltage Vi and output voltage Vo is described by the equation V'=Vi+Vo.

When switches S1 and S2 are on, the voltage across input inductor L10 and output inductor L11 will both be the equal to the value Vi. When switches S1 and S2 are off and diodes D13 and D14 are conducting, the voltage across L10 and L11 will both be equal to the value Vo. If the inductance value of L10 and L11 are identical, then the magnetic flux generated by both components will be identical because the volt-second relationship of the magnetic core will be identical. L10 and L11 can then be wound together on the same magnetic core and still generate the same magnetic flux. Ideally, this will decrease the AC ripple current in both inductors by half if the leakage inductances of each winding are equal. Although this decreases the number of magnetic cores from two to one, the core cross sectional area must be greater to accommodate the higher DC current (the sum of input and output current) in order to prevent core saturation.

Figure 7:
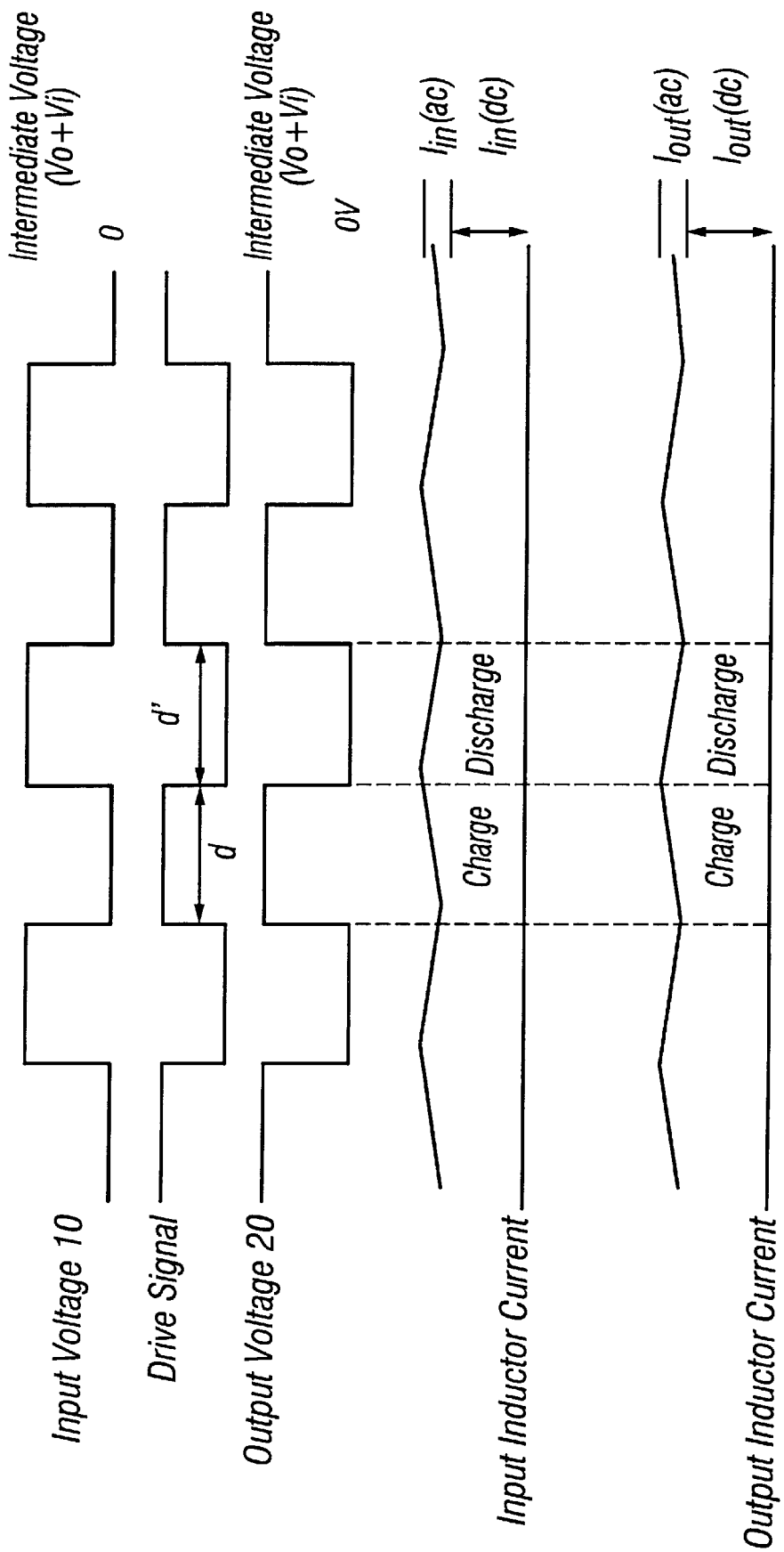
FIG. 7 is a timing diagram illustrating the timing relationships and voltage and current values in accordance with the operation of one embodiment of the present invention.

FIG. 7 shows the timing diagrams and voltage levels illustrating the operation of the circuit embodiment depicted in FIG. 6. As seen from FIG. 7, the timeline labeled "Drive" shows the signal produced by the control to activate switches S1 and S2. In one embodiment, when the control causes the drive to go "high", the switches S1 and S2 are closed for the duration of the time d when the drive signal is high. When the drive is high, the switch S1 is closed, thereby drawing the voltage at node 10 to ground and simultaneously connecting node 30 to inductor L11. Thus connected, the input current at node 10 and output current at node 20 increase slightly and continuously by virtue of the inductor charging action. In addition, when the control signal is high, the output voltage at node 20 is pulled to the voltage at node 30.

As the control signal goes "low" to cause the switches S1, S2 to open, the input voltage at node 10 transfers through diode D13 to node 30, thereby accumulating with the voltage across capacitor C10. Simultaneously, the voltage at node 20 discharges to ground across inductor L11 and capacitor C11, and as the output node 20 is held at ground, the input current at node 10 and the output current at node 20 slowly, continuously and synchronously diminishes.

As will be appreciated by those skilled in the art, the synchronous and continuous input and output currents provide minimized AC ripple at the input and output of the DC/DC converter of the present invention. Having a continuous noise waveform at the inputs and outputs allows the input capacitance values to be reduced, and further reduces the need to provide filter circuitry to prevent noise from passing to peripheral circuitry to which the DC/DC converter is connected.

As will be appreciated by those skilled in the art in reviewing the embodiments depicted in FIGS. 6 and 7, the present invention can convert an input DC voltage to a greater output DC voltage by controlling the duration of the "high" drive time d in relation to the periodic cycle of the drive signal. Thus, to increase the value of the output voltage Vo in relation to the input voltage Vi provided by the DC/DC converter of the present invention, the duration of the "high" drive time d is increased. Conversely, to generate an output voltage Vo which is less than the input Vi, the DC/DC converter of the present invention reduces the duration of the "high" drive time d in relation to the periodic cycle of the control signal.

It will further be appreciated by those skilled in the art that the present invention operates to provide a continuous current at the input and output when a minimum load is present on the output which may have some small amount of ripple current present at the input and output nodes, although in accordance with one embodiment such ripple current may preferably be approximately 1/10 of the DC current value. The value of the ripple current typically determines the required minimum load.

As those skilled in the art will appreciate, the minimized current rippling at the input and output of a DC/DC converter advantageously reduces the amount of conductive noise and electromagnetic noise that may be caused by such rippling. There are many applications of DC/DC converter technology where reduced RF emissions are desirable and beneficial results of the operation of the present invention.

While an embodiment of the present invention is described generally with respect to FIG. 6, persons skilled in the arts will appreciate that selected advantages of the present invention are obtained in connection with selectively and synchronously charging and discharging intermediate node 30 across first inductor type element L10 and second inductive type element L11, respectively, in such a manner that the ratio of the output voltage at the second inductive element L11 to the input voltage at the first inductive element L10 is defined with reference to the duty cycle of the control signal for controlling the synchronous switching. In accordance with a further embodiment of the present invention, the control signal may operate as a finction of the output voltage Vo to maintain a given output voltage, regardless of the input voltage, by dynamically changing the duty cycle of the control signal.

Figure 8:
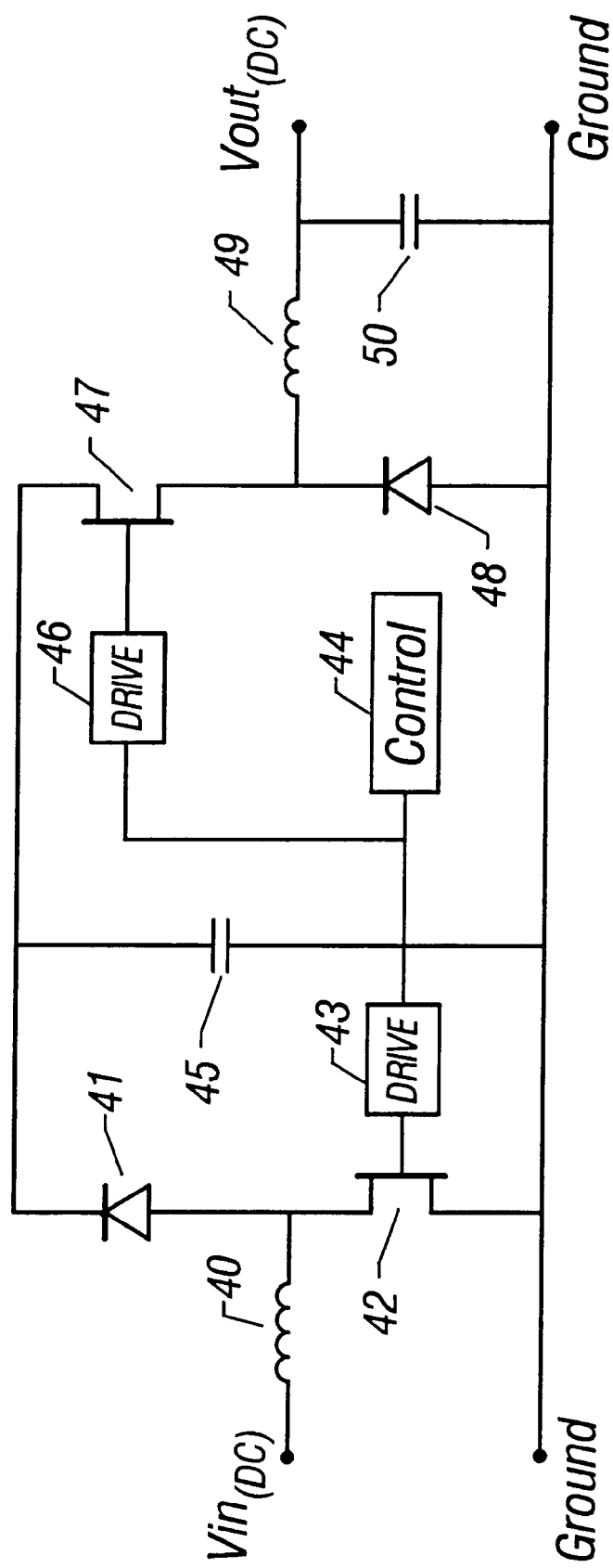
FIG. 8 is an electrical schematic diagram of an alternate embodiment of the synchronous DC/DC converter of the present invention.

An alternative, non-isolated embodiment of the present invention is shown in FIG. 8 which uses MOSFET devices as switches in a simple and low cost configuration. As shown in FIG. 8, switches 42 and 47 are both MOSFET switches which may be either n-type or p-type devices. Depending upon the polarity of the MOSFET switches 42, 47, the drive circuitry 43 and 46 will generate the appropriate polarity of control drive signal to selectively and synchronously activate the switches 42, 47. Persons skilled in the art will appreciate that the polarity of the switches and the corresponding drive requirements will be implemented in accordance with the present invention to synchronously charge and discharge intermediate node V' across input inductor 40 and output inductor 49, respectively, such that the output voltage Vout measured across out the capacitor 50 is a function of the input voltage Vin multiplied by the time during which the switches 42, 47 are "closed" (conducting current) divided by the time when the switches 42, 47 are "open" (not conducting).

Figure 9:
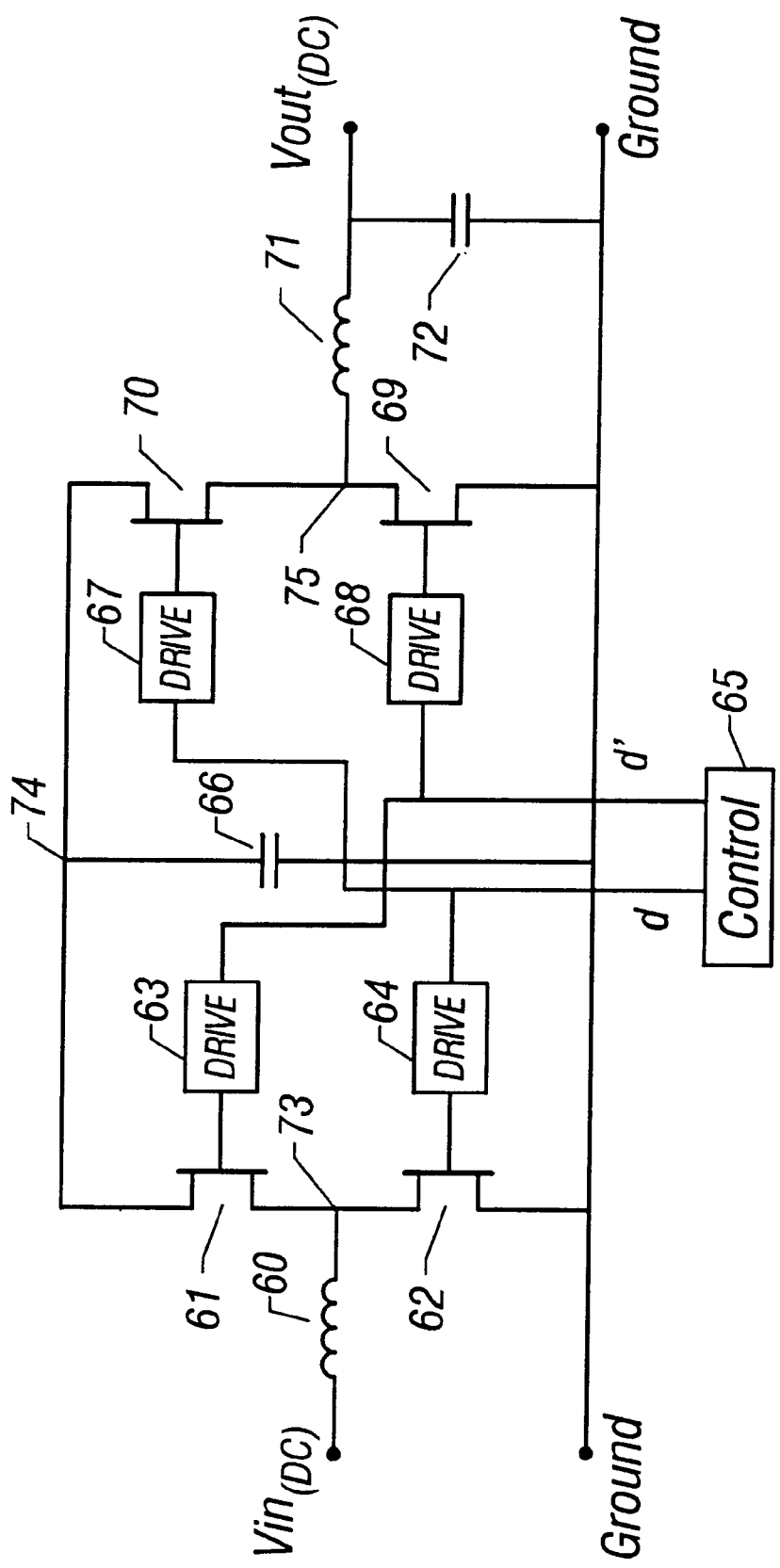
FIG. 9 is an electrical schematic diagram of a MOSFET implementation of the synchronous DC/DC converter of the present invention.

Shown in FIG. 9 is an alternate embodiment of the present invention wherein MOSFET devices are used as diodes and switches to provide a bidirectional DC/DC converter. By replacing the diodes with MOSFET switches, the DC/DC converter provides improved power dissipation, thereby allowing higher current flow through the device for a similarly sized circuit.

As seen in FIG. 9, the input voltage Vin is applied across first inductor 60 to a first internal node 73 which, in turn, is selectively coupled across switching devices 61, 62, 69 and 70 (under control of the corresponding drive circuits 63, 64, 68 and 67) to synchronously charge second inductor-type device 71 and capacitor element 72 such that the output voltage Vout is a function of the input voltage Vin and the duty cycle of the control signals d, d' generated by control signal generator 65. In one embodiment, the control signals d and d' are substantially inverted from one another, so that when switch 61 is open, switch 62 is closed to connect internal node 73 to ground, and when switch 62 is open, switch 61 is closed to connect node 73 to intermediate node 74, and thereby charge capacitor 66. Simultaneously, when switch 69 is closed to connect node 75 to ground, switch 70 is open and any current stored in inductor element 71 will discharge across capacitor 72 to generate output voltage Vout. Likewise, when switch 69 is open, switch 70 is closed to connect intermediate node 74 (and its attendant voltage) to node 75 and thereby charge inductor element 71.

In the configuration of FIG. 9, the DC/DC conversion function is bidirectionally provided with minimal ripple current at the input and output by selectively controlling the generation of control signals d, d' to switch from a first mode (wherein the output voltage Vout is converted to a predetermined input Vin using a first control signal that is a function of a predetermined input voltage value) to a second mode where the control signals convert an input voltage Vin to an output voltage Vout as a function of a predetermined output voltage. As will be described below, one such application of this embodiment is a DC/DC converter used in a backup battery supply setting wherein a primary voltage source for an application is used to charge the backup battery during the first mode, and the backup battery is used to supply power for the application in the second mode.

Figure 10:
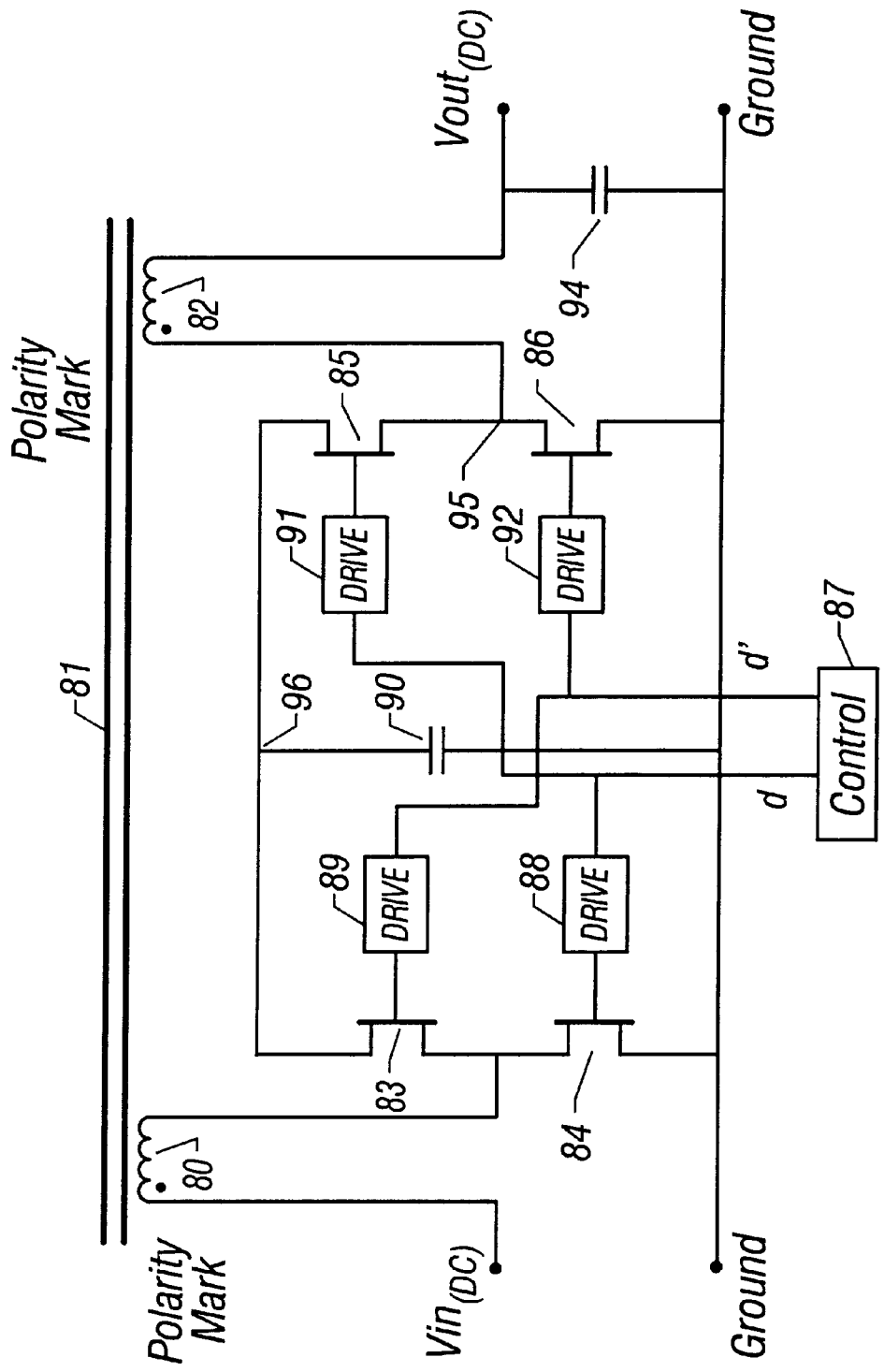
FIG. 10 is an electrical schematic diagram of a shared inductor embodiment of the DC/DC converter of the present invention.

In FIG. 10 is an alternate embodiment of the present invention wherein the input inductor and output inductor are coupled together on a common magnetic core to advantageously reduce circuit construction costs and further reduce AC ripple effect by virtue of the synchronized switching of equivalent volt-seconds across each inductor to generate magnetic flux which is effectively split between the inductors, thereby reducing AC current ripple at the inputs and outputs. As seen in FIG. 10, the input voltage Vin is applied across a first inductor element 80 where, in this example, the inductor is coupled to the circuit so that its first polarity mark receives the input voltage Vin. The opposite side of the first inductor 80 is selectively switched across MOSFET switches 83, 84, 86 and 85 to an internal node 95 which, in turn is coupled to the same polarity mark of the second inductor device 82. In this embodiment, input inductor 80 and output inductor 82 have substantially the same voltage-second characteristic, and can be placed on a common core 81 to thereby save and conserve valuable circuit board space and assembly costs by reducing the component count and mounting expenses for the inductors.

In all other respects, the bidirectional, MOSFET-implemented DC/DC converter of FIG. 10 operates similarly to the embodiment disclosed and described in connection with FIG. 9 so that the intermediate node 96 is charged to an intermediate voltage by the input voltage Vin across first inductor 80 and switch 83 when that the control signals generated by control circuit 87 cause switch 83 to close and switch 84 to open, where such intermediate voltage is stored across capacitor 90. When the control signals d, d' selectively cause switch 83 to open and switch 84 to close, and at the same time switch 85 to close and 86 to open, the voltage at intermediate node 96 charges inductor 82 which, during the next phase of the control signals (wherein switch 85 is closed and switch 86 is open) discharges across capacitor 94 to generate output voltage Vout.

Figure 11:
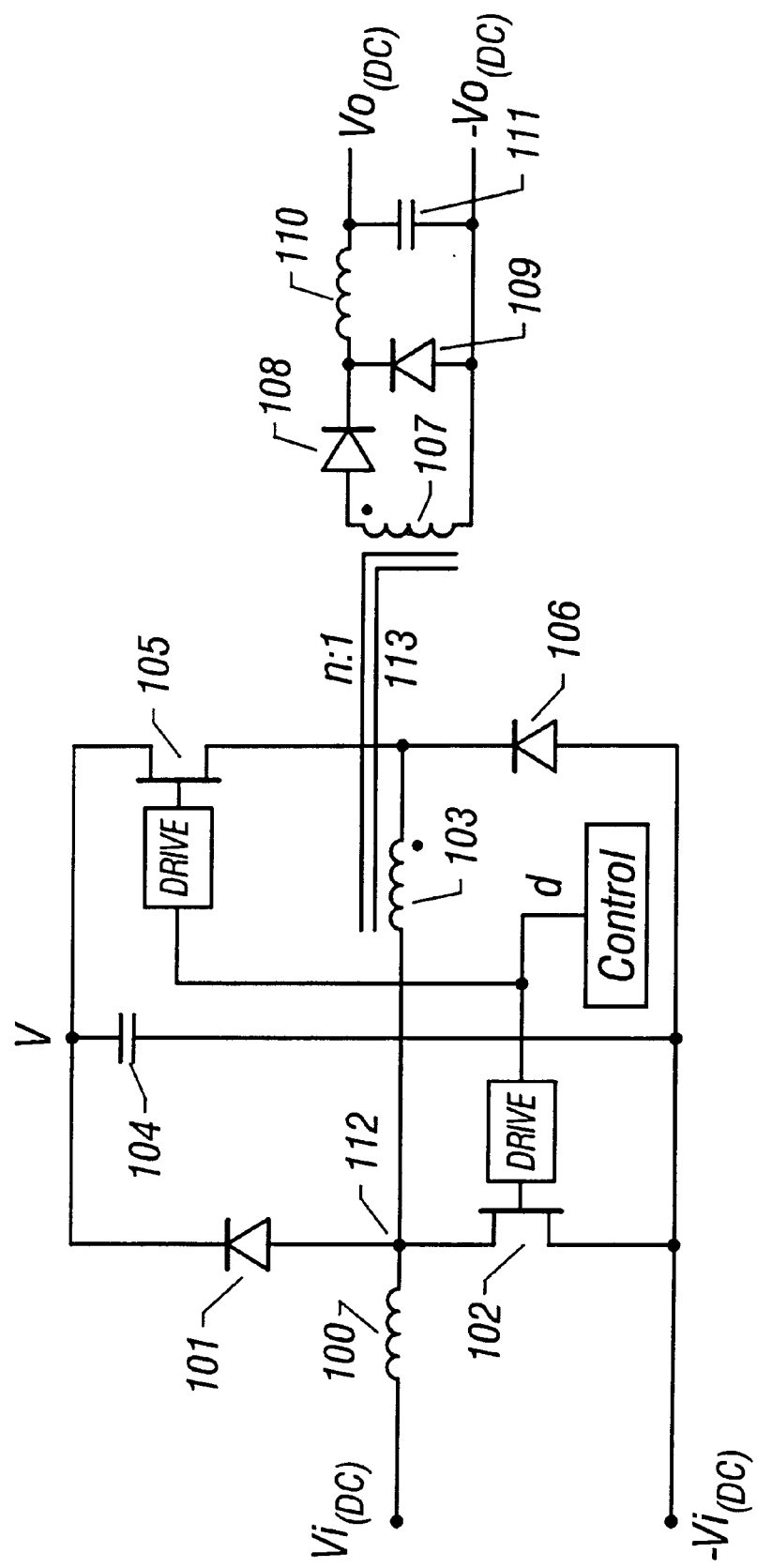
FIG. 11 is an electrical schematic diagram of an isolated embodiment of the present invention.

While embodiments of the present invention described thus far have been with reference to selected non-isolated configurations wherein the output voltage and input voltage to be converted share a common ground, the present invention may advantageously be used in applications where the input voltage and output voltage are isolated from one another. Shown in FIG. 11 is one exemplary embodiment where the switching elements of a boost converter and a two transistor forward converter are synchronized. A positive input voltage Vi and its corresponding negative value −Vi are applied as inputs such that the positive voltage input is connected across the first input inductor 100 to an internal input node 112. Internal node 112 is coupled across switch 102 (under control of drive signal d) to the negative input voltage. In addition, node 112 is connected to a first terminal of diode 101. The second terminal of diode 101 is connected to an intermediate node with a voltage V' measured across capacitor 104 which is referenced to negative input node −Vi. Inductor 100, switch 102, diode 101 and capacitor 104 operate as a boost converter where an intermediate voltage V' is generated that is greater than the input voltage Vi.

A two transistor forward converter operates synchronously with the boost converter and transforms intermediate voltage V' into secondary output voltage Vo. Switch 105 operates synchronously with switch 102 such that, when both switches are "on," an intermediate voltage V' is developed across primary winding element 103 of transformer 113, and is transformed into a secondary voltage across secondary winding element 107 of transformer 113. The secondary voltage is proportional to the primary voltage as the ratio, n, of primary to secondary turns wound on each winding element. The secondary voltage is applied to the first terminal of output inductor 110 through diode 108, causing the inductor 110 to charge. When switches 102 and 105 are "off," the magnetizing energy stored in transformer 113 is discharged as current through winding element 103 and diodes 101 and 106, generating a reverse voltage across primary transformer element 103 equal to the intermediate voltage V'. When the energy discharge is complete, the transformer has reset and the voltage across it will drop to zero. The transformed voltage across secondary winding element 107 is proportional to the primary voltage. The secondary voltage during this period is opposite in polarity and reverse biases diode 108, allowing inductor 110 to discharge through diode 109 and output capacitor 111. The output voltage across capacitor 111 is determined by the function Vout=(Vin/n)×d/(1−d), where n is the ratio of primary turns to secondary turns of the transformer and d is the duty cycle of the synchronous switches.

Advantages of this configuration are the same as the non-isolated configuration, namely, continuous input and output AC ripple currents, wide range of operable input voltages, and the capability to couple the input and output inductors on a single magnetic element. In addition, a transformer-based implementation of the present invention allows the input and output voltages to be electrically isolated, thereby providing protection from hazardous voltage transients on the input, allowing input voltages much greater than the output voltage, allowing voltage inversion on the output, and providing localized grounding. In one embodiment, the maximum duty cycle is 50% in order for the transformer to reset with equivalent volt-seconds for the "on" and "off" periods.

Figure 12:
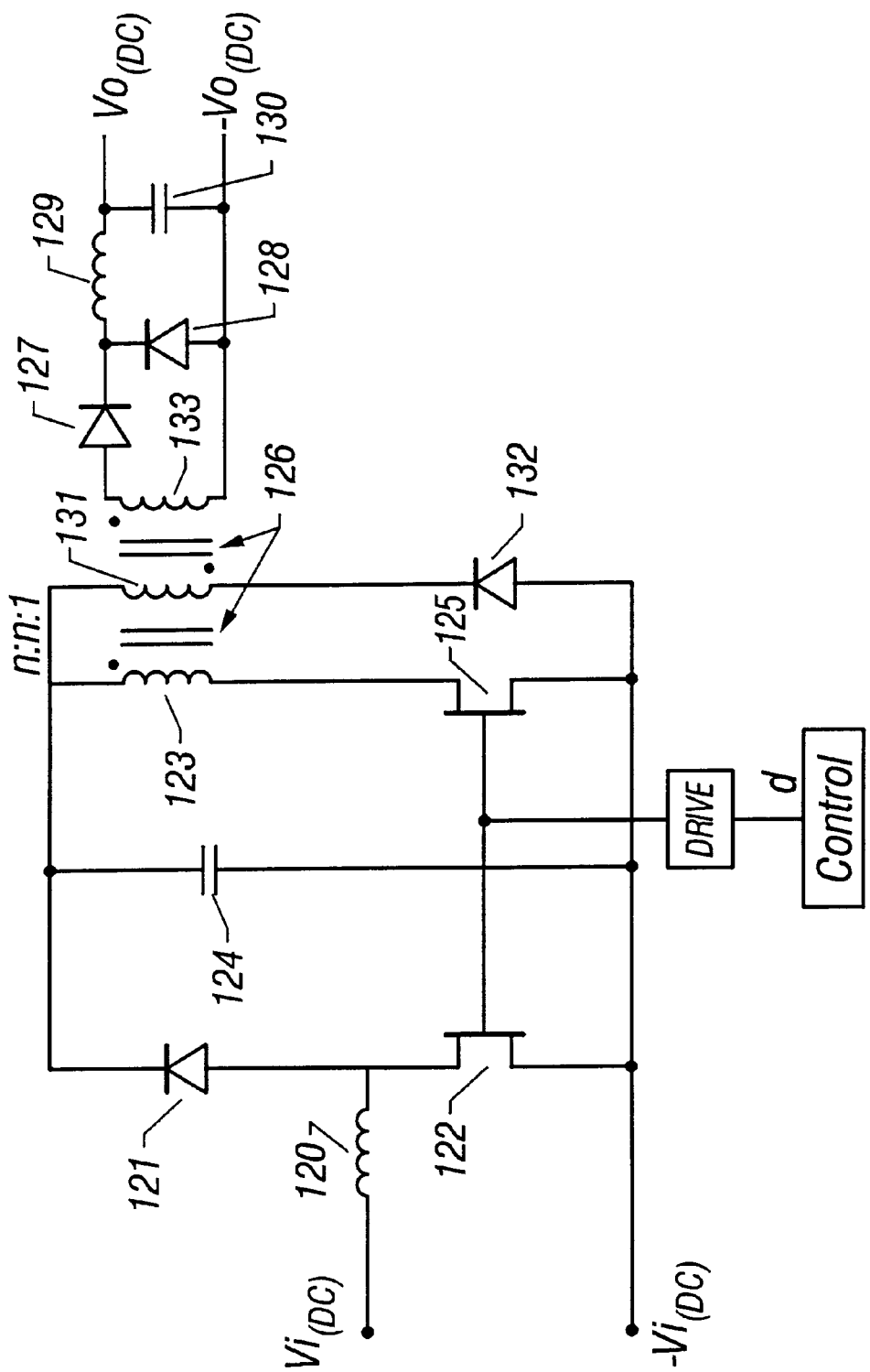
FIG. 12 is an electrical schematic diagram of an alternate embodiment of the isolated DC/DC converter of the present invention including a single transistor forward converter.

An alternate isolated embodiment of the present invention may be implemented by synchronizing the switching elements of a boost and single transistor forward converter as shown in FIG. 12. The boost elements are inductor 120, switch 122 (controlled by drive signal d), and diode 121 which convert an input voltage Vi into an intermediate voltage V' across capacitor 124. A single transistor forward converter operates synchronously with the boost converter and transforms an intermediate voltage V' into a secondary output voltage Vo. When switch 125 is "on" (synchronously with switch 122) an intermediate voltage V' is developed across the primary winding element 123 of transformer 126. This voltage is transformed into a first secondary voltage proportional to the primary voltage as the ratio of primary to secondary transformer winding turns, n, which is developed across the secondary winding element 133 of transformer 126. The secondary voltage is applied to output inductor 129 through diode 127 and capacitor 130, causing it to charge. When switch 125 is "off," the magnetizing energy stored in the transformer 126 is discharged through a secondary element 123 of transformer 126 and diode 131, causing a voltage equal to the intermediate voltage V' to be applied across secondary element 123 opposite in polarity from the voltage applied during the "on" period. When the energy discharge is complete, the transformer has reset and voltage across it will drop to zero. The transformed voltage across the primary element 123 and secondary element 133 are reversed and proportional in voltage as the turns ratio. The secondary voltage reverse biases diode 127 allowing inductor 129 to discharge through diode 128 and capacitor 130.

The output voltage across capacitor 130 is determined by the function Vout=(Vin/n)×d/(1−d), where n is the ratio of primary turns to secondary turns of the transformer and d is the duty cycle of the synchronous switches. In one embodiment, the single transistor forward converter requires a maximum duty cycle of 50%.

The single transistor forward converter has similar advantages as the two transistor forward converter when synchronized with a boost converter on the input. These advantages were described previously. One advantage of the single transistor forward converter over the two transistor forward converter is an ability to use the same drive signal for both MOSFET switches because the both switches are referenced to −Vin whereas the two transistor forward converter is most cases requires a separate drive circuit for each switch. Another advantage is reduced peak current in the boost converter switch 122. One advantage of the two transistor forward converter over the two transistor forward converter is reduced peak voltage across switch 105. Another advantage is fewer windings required on the transformer (e.g., 2 rather than 3).

Alternate embodiments of the isolated versions of the present invention are possible by using MOSFET devices as synchronous rectifiers (replacing diodes shown in FIGS. 11 and 12) in the boost stage and output stage reducing power dissipation, thereby allowing higher current flow through the device for a similarly sized circuit.

Figure 13:
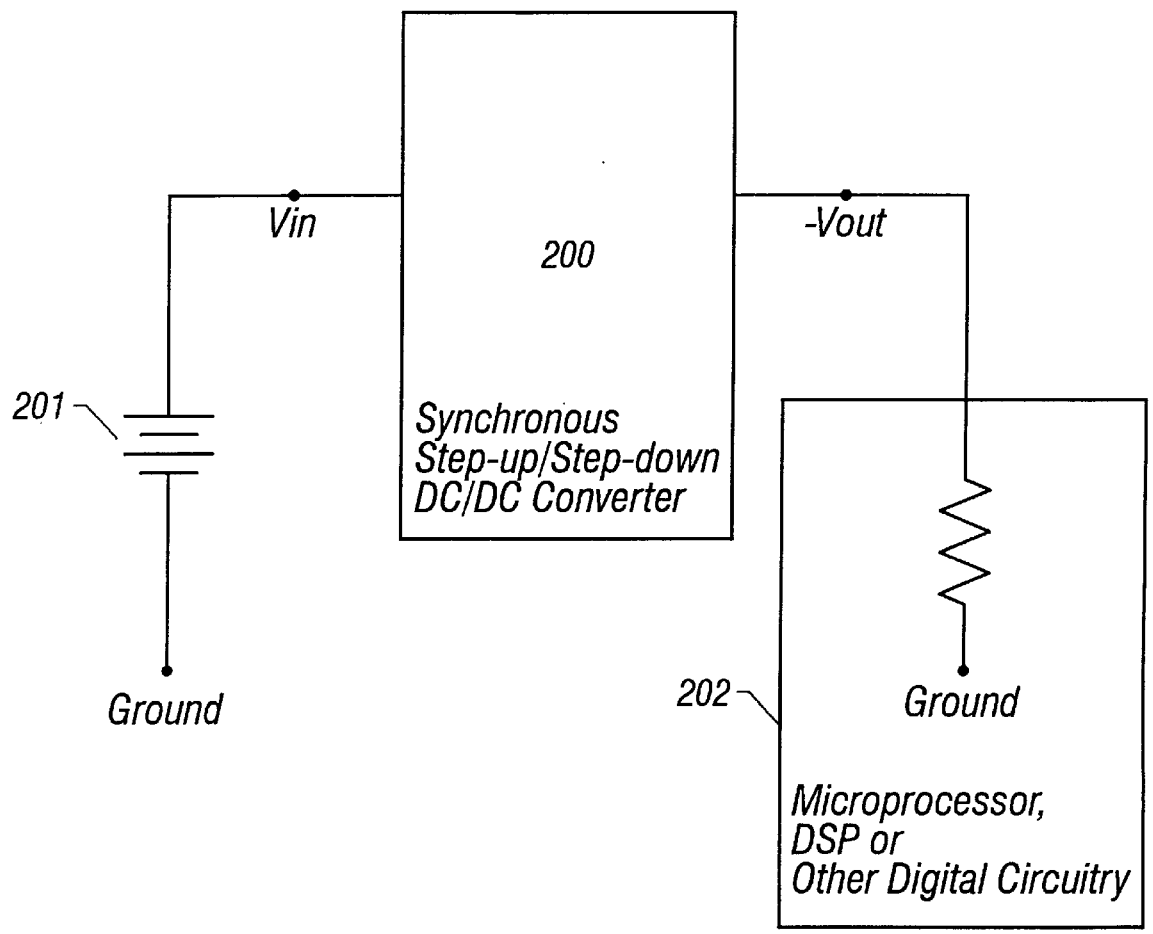
FIG. 13 is a block diagram representation of one application of the present invention.

While persons skilled in the art will appreciate the numerous and varied potential applications of the present invention, the following examples illustrate advantageous applications of various aspects of the present invention. In the example shown in FIG. 13, the synchronous step-up/step-down DC/DC converter 200 of the present invention is connected between a first power supply 201 and an electronic device 202. In one example, the power supply 201 (for example, a battery) provides a first predetermined voltage or range of voltage values, and the electronic apparatus 202 (for example, a portable computer) requires a second predetermined voltage value. In such an application, a battery providing a range of voltages between 2.7 volts and 3.6 volts would serve as a power supply 201, and would be connected to the DC/DC converter 200 of the present invention as Vin. In accordance with the circuit design and operation described herein, the DC/DC converter 200 would convert the input voltage or range of voltages from power supply 201 to the predetermined voltage value required by electrical apparatus 202, using the dynamic control signal generator to determine the duty cycle of the control signal as the function of the desired output voltage Vout. Numerous examples of this potential application of the present invention exist, including notebook computers, palm-held computers, PDAs, cell phones, pagers and other portable electronic equipment.

Figure 14:
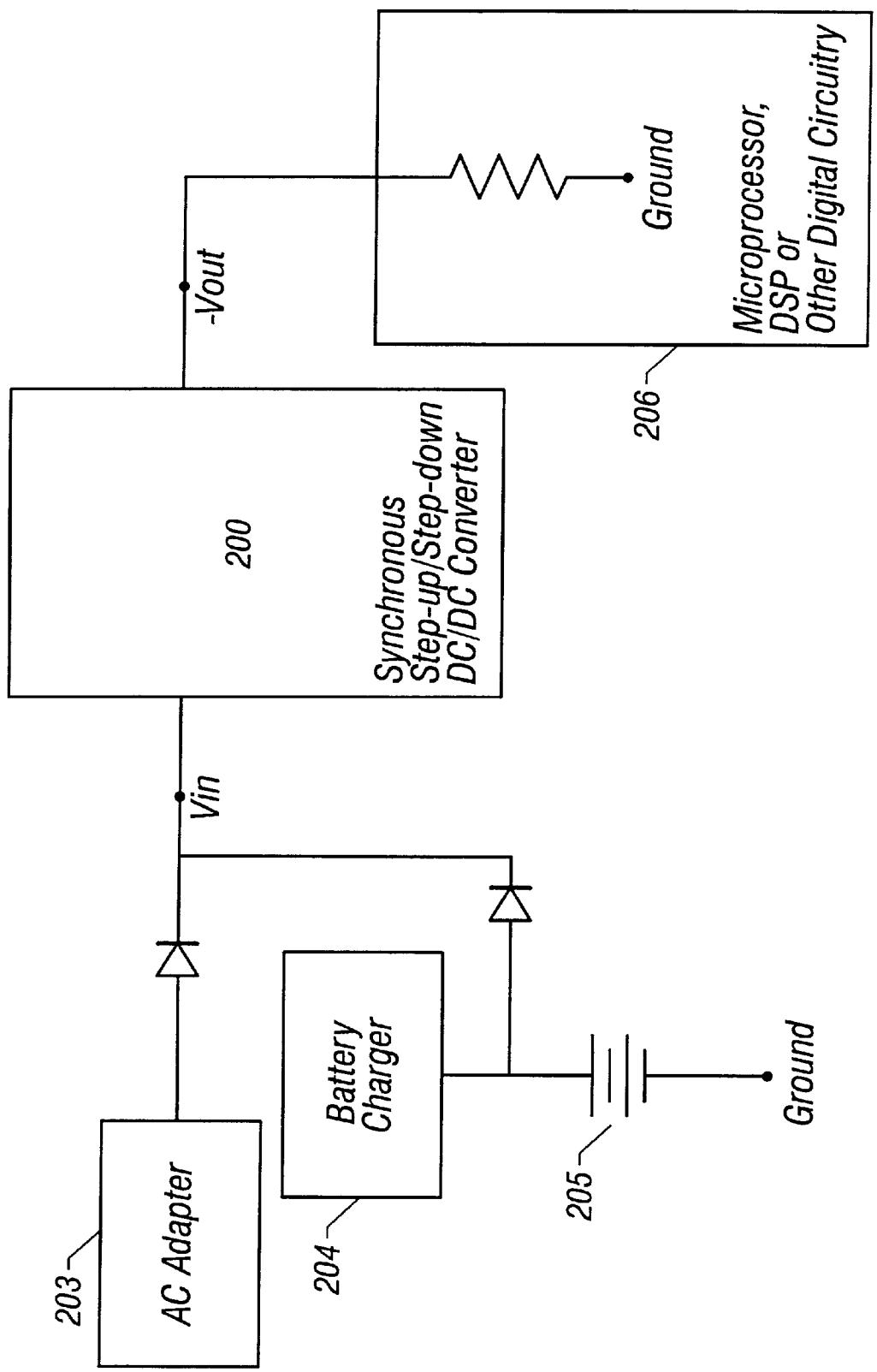
FIG. 14 is a block diagram representation of an alternate application of the present invention.

Shown in FIG. 14 is another illustrative example of an application of the present invention wherein the DC/DC converter is coupled between an electrical apparatus 206 and two alternate power supplies, such as a primary supply 203 and a backup supply 204, 205. In such a battery backup configuration, the DC/DC converter 200 of the present invention converts a plurality of power supplies which may provide different voltage inputs or even differing ranges of voltage inputs. For example, an AC adapter 203 could provide an input voltage between the range of 6 and 12 volts, while the backup battery provides voltages across a range of 2.7 to 4.2 volts. With both power supplies selectively coupled to the input voltage terminal of the DC/DC converter of the present invention, either power supply is readily converted to the predetermined output voltage required by the electrical apparatus 206. As seen from this illustrative example, a single DC/DC converter of the present invention can be used to provide a predetermined voltage, regardless of the input voltage value. For example, if the primary power supply 203 provides a voltage of 12 volts which is converted by the DC/DC converter 200 to a 3.3 volt value required by the electrical circuit 206, this same converter can be used, in the event of losing the primary power supply 203, to convert the battery backup voltage of 2.7 volts up to the predetermined 3.3 volt value required by the electrical apparatus 206, all under the control of the dynamically adjustable control signals which determine the duty cycle of the control signal as a function of the desired output voltage.

Figure 15:
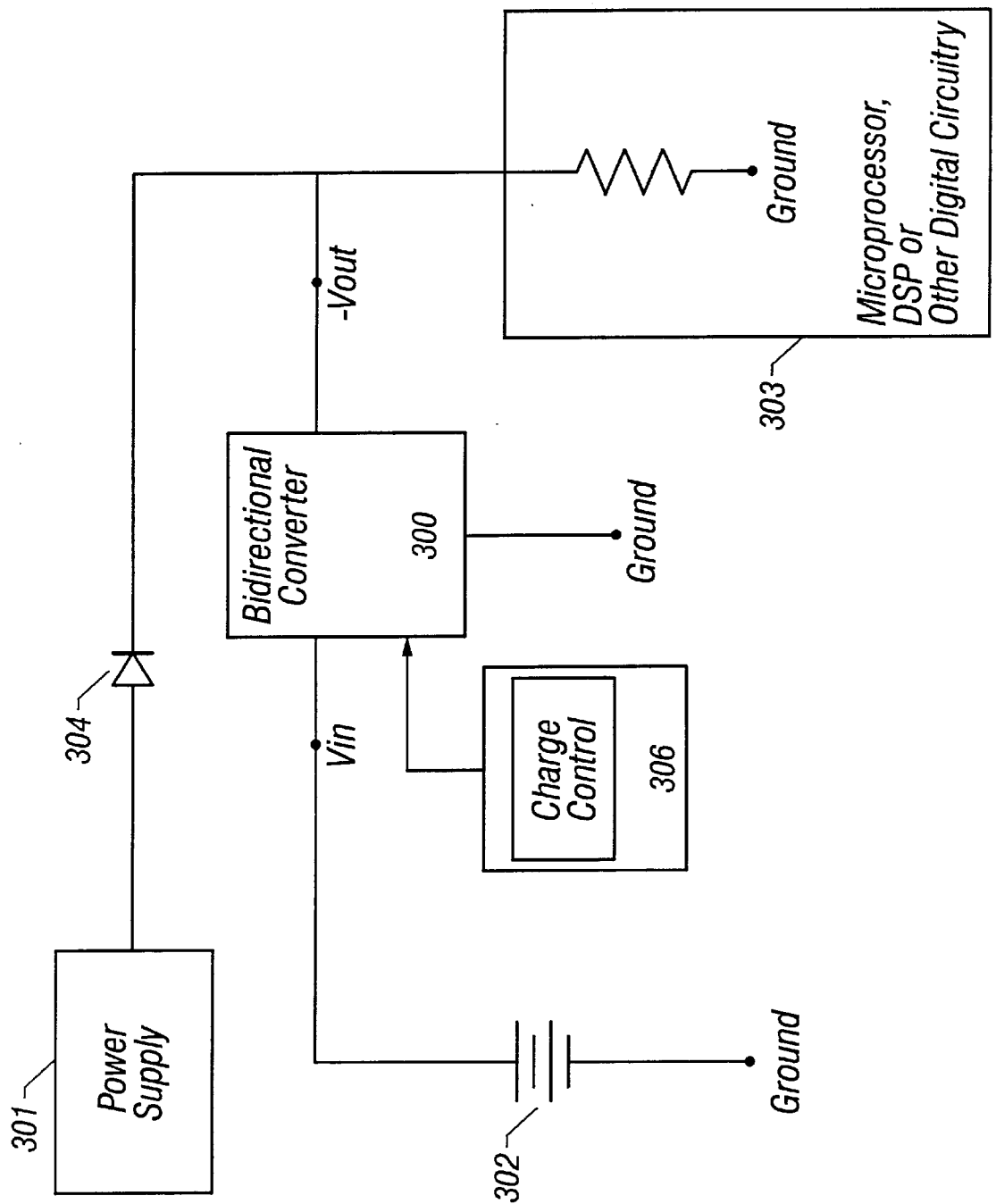
FIG. 15 is a block diagram of yet another alternate application of the present invention.

Yet another potentially advantageous application of one embodiment of the present invention is shown in FIG. 15 wherein the bidirectional DC/DC converter 300 is connected between an electronic apparatus 303 and a rechargeable backup battery 302. The bidirectional nature of the DC/DC converter 300 allows the converter output to be connected through a primary power supply 301 across diode 304 or any other current direction limiting device so that the primary power supply, when in operation provides not only power to the electrical apparatus 303, but also is used to charge the backup battery 302 by converting the power supply voltage across the bidirectional DC/DC converter 300 to the backup voltage charge requirement at the Vin terminal under control of the charged control signal 306. At any time when the primary power supply 301 is discontinued, the voltage from the backup battery 302 is converted by bidirectional DC/DC converter 300 to generate the predetermined voltage at terminal Vout required by the electrical apparatus 303, again under the control of the appropriate charge control signals generated by control signal generator 306.

Figure 16:
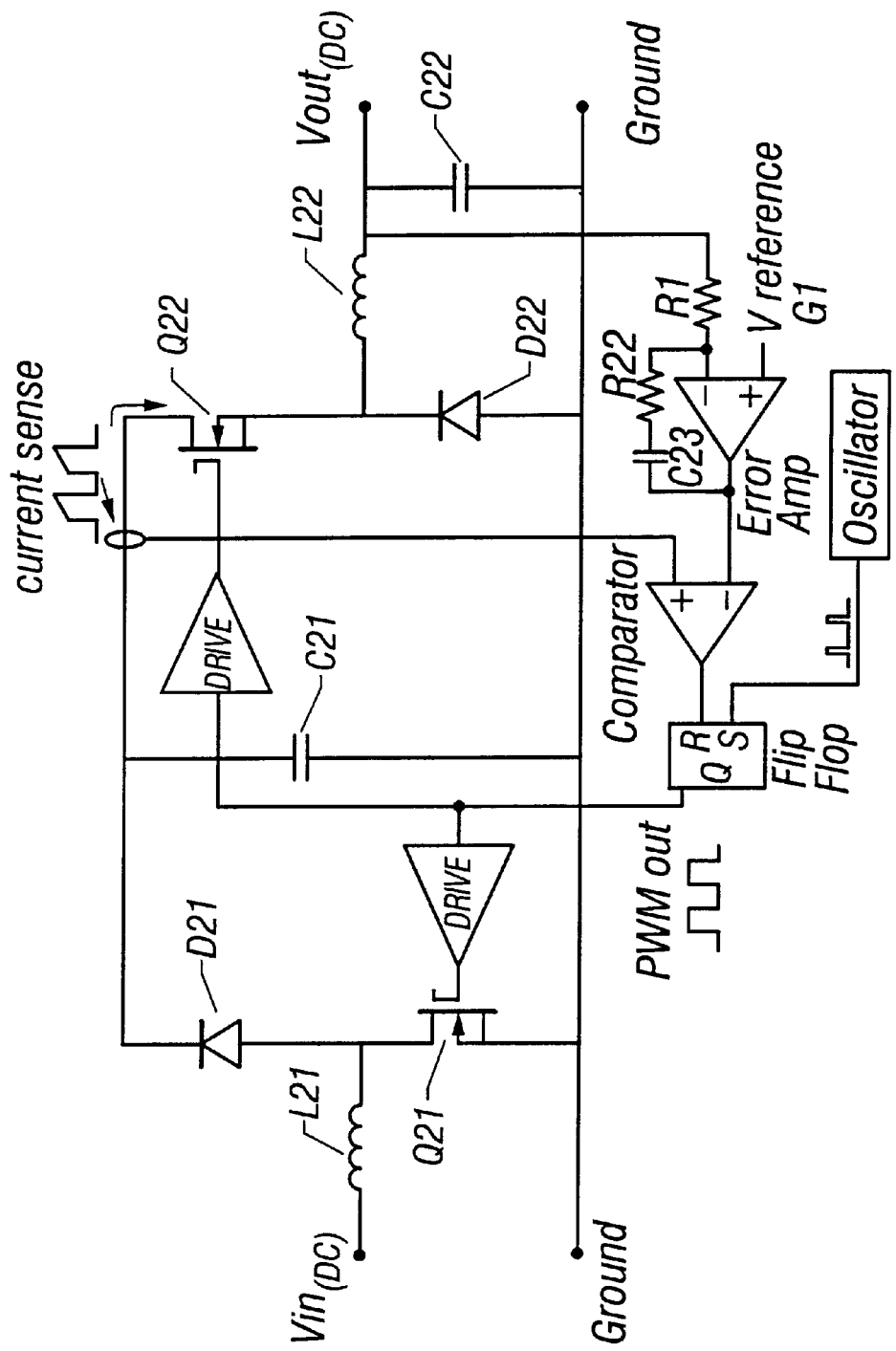
FIG. 16 is an electrical schematic diagram illustrating an example of a control mechanism used in connection with the present invention.

FIG. 16 is an electrical schematic diagram illustrating an example of a control mechanism used in connection with the present invention. As will be appreciated, the control mechanism for the present invention can be implemented with many techniques. In one instance a current mode control technique can be employed. As shown in FIG. 16, the output voltage is sensed and compared to a fixed reference voltage. The difference is the voltage error and is amplified by G1. The output of the amplifier G1 is used as a current reference. The current through MOSFET Q22 is sensed and compared to the current reference at the comparator. When the peak current reaches the threshold set by the current reference, the MOSFET devices Q22 and Q21 are turned off and remain off until the beginning of the next cycle. When Q22 is "on," the current sensed is actually the current flowing through inductor L22 and increases as the inductor is charged. When Q22 is "off," no current is sensed but the inductor current decreases as it is discharged. Thus, at the beginning of the cycle when Q21 and Q22 are switched on, the sensed current is below the current reference and rises to the threshold, thereby turning off Q21 and Q22. The duty cycle is determined by the level of the current reference. The higher the current level reference, the greater the duty cycle. A positive voltage error results in a reduced current reference level decreasing the duty cycle. A decreased duty cycle will result in a reduced current flow to the output, thus lowering the output voltage until the error reaches zero.

Stability of the present invention is achieved by compensation techniques within the control loop. In the case of current mode control, the error amplifier can be compensated with the addition of a resistor R22 and capacitor C23 as feedback elements which compensate for the phase shift added to the frequency response due to the filter capacitor on the output node. The value of the compensation elements determines the gain and phase of the closed loop system. Stability is assured when with increasing frequency the gain of the control loop drops below 0 decibels before the phase reaches 360 degrees.

In a selected embodiment, stability is advantageously provided by having the impedance (the relationship between a voltage and current) of the output of the boost stage converter, including the intermediate node capacitor, be lower than the impedance of the input of the buck stage converter over the entire frequency spectrum. Although the control loop can be compensated with attention only to the elements of the buck stage, there can be unstable interaction with the boost stage if the stated criteria is not achieved. In practical application, increasing the value of the intermediate capacitor will reduce the output impedance of the boost stage sufficiently to meet the stability condition.

It will be appreciated by those skilled in the art that the present invention can be implemented in discrete form or as an integrated circuit, to the extent available process technologies permit. It will further be appreciated by those skilled in the art that control signal generation for generating signals d and d' are a function of the desired output voltage that is being generated by the converter, whether used in a traditional or bidirectional capacity. Likewise, those skilled in the art will appreciate that dynamic control signal generation techniques are available to maintain a predetermined output voltage, even when the input voltage value fluctuates, by altering the duty cycle of the required control signal.

While the synchronous DC/DC converter of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A DC/DC converter comprising:
   an input terminal, an output terminal, and a ground terminal;
   a first inductor having a first terminal connected to the input terminal and a second terminal;
   a first switch for connecting the second terminal of the first inductor to the ground terminal;
   a second switch having a first terminal connected to the second terminal of the first inductor and a second terminal;
   a first capacitor having a first plate connected to the second terminal of the second switch and a second plate connected to the ground terminal;
   a second inductor having a first terminal connected to the output terminal and a second terminal;
   a third switch for connecting the second terminal of the second inductor to the first plate of the first capacitor;
   a fourth switch having a first terminal connected to the second terminal of the second inductor and a second terminal connected to the ground terminal;
   a second capacitor connected between the output terminal and ground terminal;
   a control signal generator, connected to the output terminal, for generating at least a first common control signal to synchronously control at least the first and third switches such that energy stored in the first inductor is transferred to the first capacitor when the first switch is open and energy stored in the second inductor is transferred to the second capacitor when the third switch is open, and wherein the duty cycle of the first common control signal is dynamically adjusted in response to changes in a voltage level of the output terminal to maintain a constant value for the voltage level of the output terminal.

2. The DC/DC converter of claim 1, wherein the first and second inductors are integrated onto a common magnetic core.

3. The DC/DC converter of claim 1, wherein the first and third switches are MOSFET power transistors.

4. The DC/DC converter of claim 1, wherein the second and fourth switches are diodes.

5. The DC/DC converter of claim 1, wherein the control signal generator generates a second common control signal for controlling the second and fourth switches, where the second common control signal is the complement of the first common control signal.

6. The DC/DC converter of claim 1, wherein the second and fourth switches are MOSFET transistors.

7. A method for converting a first voltage to a second voltage in a circuit having an input node, an intermediate node and an output node, comprising:
   generating a control signal having a first phase and a second phase;
   selectively applying the first voltage across a first inductor coupled to the input node thus charging current in the first inductor during the first phase of the control signal;
   selectively charging the intermediate node with discharging current from the first inductor during the second phase of the control signal to generate an intermediate voltage on the intermediate node;
   selectively connecting the intermediate voltage to a second inductor coupled to the output node thus charging current in the second inductor during the first phase of the control signal; and
   developing the second voltage across an output capacitor coupled to the output node with discharging current from the second inductor.

8. The method of claim 7, where the second voltage developed divided by the first voltage is equal to the ratio of the duration of the first phase to the duration of the second phase.

9. The method of claim 7, wherein the first phase of the control signal is the high portion of the control signal and the second phase of the control signal is the low portion of the control signal, and the value of the second voltage is greater than the value of the first voltage when the duration of the first phase of the control signal is greater than the duration of the second phase of the control signal.

10. The method of claim 7, wherein the first phase of the control signal is the high portion of the control signal and the second phase of the control signal is the low portion of the control signal, and the value of the second voltage is less than the value of the first voltage when the duration of the first phase of the control signal is less than the duration of the second phase of the control signal.

11. The method of claim 7, wherein said selectively applying the first voltage across a first inductor further comprises connecting the first inductor in parallel with the first voltage with a switch that is conductive during the first phase of the control signal.

12. The method of claim 7, wherein said selectively charging the intermediate node with current from the first inductor comprises discharging the first inductor across a capacitor connected between the intermediate node and ground.

13. The method of claim 7, wherein said selectively connecting the intermediate voltage to a second inductor comprises connecting the second inductor in series with the intermediate node with a switch that is conductive during the first phase of the control signal.

14. The method of claim 7, wherein said developing the second voltage across an output capacitor comprises connecting the second inductor in parallel with the output capacitor during the second phase of the control signal.

15. The method of claim 7, wherein said developing the second voltage is electrically isolated from said selectively applying the first voltage across the first inductor.

16. The method of claim 7, wherein said generating the control signal comprises dynamically adjusting the duration of the first phase in response to any change in the first voltage to maintain a constant value for the second voltage.

17. The method of claim 7, wherein said selectively applying the first voltage across the first inductor and selectively connecting the intermediate voltage to the second inductor comprise using first and second inductors that have substantially equivalent volt-second characteristics and that are integrated on a common magnetic core.

18. A DC/DC converter for converting a first voltage to a second voltage, referred to common ground, comprising:

a first subcircuit for charging an intermediate capacitor to an intermediate voltage greater than the first voltage, said first subcircuit comprising an input node for receiving the first voltage, a first inductor coupled to the input node and a first switch device for alternately connecting the first inductor to common ground and the intermediate capacitor in response to a control signal; and a second subcircuit coupled to the first subcircuit for discharging the intermediate capacitor from an intermediate voltage, said second subcircuit comprising a second inductor coupled to an output capacitor and a second switch for alternately connecting the second inductor to the intermediate capacitor and common ground in response to the same control signal to thereby generate the second voltage across the output capacitor.

19. The DC/DC converter of claim 18, wherein the second subcircuit comprises a transformer-isolated forward converter for transforming the intermediate voltage synchronized with the control signal.

20. The DC/DC converter of claim 18, wherein the first and second inductors share a common magnetic core.

* * * * *